(12) United States Patent
Osinga et al.

(10) Patent No.: US 8,577,866 B1
(45) Date of Patent: Nov. 5, 2013

(54) CLASSIFYING CONTENT

(75) Inventors: Douwe Osinga, Zurich (CH); Stefan Christoph, Uster (CH)

(73) Assignee: Googe Inc., Mountain View, CA (US)

( * ) Notice: Subject to any disclaimer, the term of this patent is extended or adjusted under 35 U.S.C. 154(b) by 0 days.

(21) Appl. No.: 11/608,207

(22) Filed: Dec. 7, 2006

(51) Int. Cl.
G06F 7/00 (2006.01)
G06F 17/30 (2006.01)

(52) U.S. Cl.
USPC .......................................... 707/710; 707/751

(58) Field of Classification Search
USPC .............................. 707/5, 999.005, 751, 710
See application file for complete search history.

(56) References Cited

U.S. PATENT DOCUMENTS

| | | | |
|---|---|---|---|
| 6,285,999 B1 * | 9/2001 | Page | 707/5 |
| 6,510,406 B1 * | 1/2003 | Marchisio | 704/9 |
| 6,628,412 B1 | 9/2003 | Jeran et al. | |
| 6,658,423 B1 | 12/2003 | Pugh et al. | |
| 6,978,419 B1 | 12/2005 | Kantrowitz | |
| 7,403,932 B2 * | 7/2008 | Kao et al. | 706/45 |
| 7,814,048 B2 | 10/2010 | Zhou et al. | |
| 8,055,626 B1 * | 11/2011 | Jain | 707/655 |
| 8,135,662 B2 | 3/2012 | Bollen et al. | |
| 8,244,737 B2 * | 8/2012 | Liu et al. | 707/748 |
| 8,364,669 B1 * | 1/2013 | Chowdhury et al. | 707/726 |
| 2003/0050909 A1 | 3/2003 | Preda et al. | |
| 2003/0164849 A1 | 9/2003 | Barrie et al. | |
| 2003/0229622 A1 * | 12/2003 | Middelfart | 707/2 |
| 2003/0229858 A1 | 12/2003 | Keohane et al. | |
| 2005/0038787 A1 | 2/2005 | Cheung et al. | |
| 2005/0060643 A1 | 3/2005 | Glass et al. | |
| 2005/0071741 A1 * | 3/2005 | Acharya et al. | 715/500 |
| 2005/0165780 A1 * | 7/2005 | Omega et al. | 707/7 |
| 2005/0203924 A1 * | 9/2005 | Rosenberg | 707/100 |
| 2005/0234877 A1 * | 10/2005 | Yu | 707/3 |
| 2006/0004691 A1 * | 1/2006 | Sifry | 707/1 |
| 2006/0248076 A1 | 11/2006 | Troy et al. | |
| 2006/0253345 A1 * | 11/2006 | Heber | 705/27 |
| 2006/0287971 A1 * | 12/2006 | Armstrong | 707/1 |
| 2007/0078889 A1 | 4/2007 | Hoskinson | |
| 2007/0094232 A1 | 4/2007 | Dill et al. | |
| 2007/0266306 A1 * | 11/2007 | Koppel et al. | 715/501.1 |
| 2007/0282795 A1 * | 12/2007 | Mashinsky | 707/3 |
| 2008/0097972 A1 | 4/2008 | Gordon | |
| 2010/0058176 A1 | 3/2010 | Carro et al. | |

OTHER PUBLICATIONS

Gupta et al, "Genre Classification of Websites Using Search Engine Snippets", 2005.*
Fetterly et al, "On the Evolution of Clusters of Near-Duplicate Web Pages", 2004, Journal of Web Engineering, vol. 2, No. 4, pp. 228-246.*

(Continued)

Primary Examiner — Brannon W Smith
(74) Attorney, Agent, or Firm — Fish & Richardson P.C.

(57) ABSTRACT

Methods, systems, and apparatus, including computer program products for identifying original content. In one aspect a method is described that includes deriving a plurality of content pieces from a collection of documents, each content piece occurring in one or more documents in the collection of documents. Each document in the collection of documents is associated with a time and an author. A first document in the collection of documents is identified, the identified first document being the earliest document containing an occurrence of a first piece of content. A first author associated with the first document is ranked based on a number of documents that contain at least one occurrence of the content piece and that are associated with an author other than the first author.

13 Claims, 8 Drawing Sheets

(56) References Cited

OTHER PUBLICATIONS

Mobasher et al, "Web Mining: Pattern Discovery from World Wide Web Transactions", 1997.*
Sean Doolittle, "Spider Bytes Spiders Help Keep Track of the World Wide Web", May 2001, vol. 5 Issue 2, pp. 42-44 in print issue.
Bernstein et al., "A Scalable System for Identifying Co-derivative Documents", 2004, SPIRE 2004, pp. 55-67.
Zobel et al., "The Case of the Duplicate Documents Measurement, Search, and Science", 2006, APWEB 2006, LNCS 3841, pp. 26-39.
Finkel et al., "Signature extraction for overlap detection in documents", 2001, ACSC2002, vol. 4, pp. 55-64.
U.S. Patent and Trademark Office, Non-Final Office Action for U.S. Appl. No. 11/608,189, dated Oct. 9, 2008, 31 pages.
Fish & Richardson P.C., Amendment in Reply to Action for U.S. Appl. No. 11/608,189, dated Mar. 9, 2009, 12 pages.
U.S. Patent and Trademark Office, Final Office Action for U.S. Appl. No. 11/608,189, dated Jun. 25, 2009, 17 pages.
U.S. Patent and Trademark Office, Non-Office Action for U.S. Appl. No. 11/608,189, dated Jan. 12, 2010, 16 pages.
Fish & Richardson P.C., Amendment in Reply/Filed with RCE for U.S. Appl. No. 11/608,189, dated Oct. 26, 2009, 12 pages.
Fish & Richardson P.C., Amendment in Reply to Final Action for U.S. Appl. No. 11/608,189, dated Aug. 25, 2009, 8 pages.
U.S. Patent and Trademark Office, Non-Final Office Action for U.S. Appl. No. 11/608,203, dated Sep. 23, 2008, 16 pages.
Fish & Richardson P.C., Amendment in Reply to Action for U.S. Appl. No. 11/608,203, dated Mar. 9, 2009, 13 pages.
U.S. Patent and Trademark Office, Final Office Action for U.S. Appl. No. 11/608,203, dated Jun. 25, 2009, 13 pages.
Fish & Richardson P.C., Amendment in Reply to Final Action for U.S. Appl. No. 11/608,203, dated Aug. 25, 2009, 8 pages.
Fish & Richardson P.C., Amendment in Reply/Filed with RCE for U.S. Appl. No. 11/608,203, dated Oct. 26, 2009, 11 pages.
U.S. Patent and Trademark Office, Non-Office Action 30071 for U.S. Appl. No. 11/608,203, dated Jan. 11, 2010, 12 pages.
U.S. Patent and Trademark Office, Non-Final Office Action for U.S. Appl. No. 11/608,188, dated Sep. 17, 2008, 13 pages.
Fish & Richardson P.C., Amendment in Reply to Action for U.S. Appl. No. 11/608,188, dated Mar. 9, 2009, 12 pages.
U.S. Patent and Trademark Office, Final Office Action for U.S. Appl. No. 11/608,188, dated Jun. 10, 2009, 11 pages.
Fish & Richardson P.C., Amendment in Reply to Final Action for U.S. Appl. No. 11/608,188, dated Aug. 25, 2009, 11 pages.
Fish & Richardson P.C., Amendment in Reply/Filed with RCE for U.S. Appl. No. 11/608,188, dated Oct. 26, 2009, 9 pages.
U.S. Patent and Trademark Office, Non-Office Action for U.S. Appl. No. 11/608,188, dated Jan. 8, 2010, 10 pages.
U.S. Patent and Trademark Office, Non-Final Office Action for U.S. Appl. No. 11/608,189, dated Jul. 23, 2010, 18 pages.
Pereira et al., "Where and How Duplicates Occur in the Web," Oct. 2006, 10 pages.
U.S. Patent and Trademark Office, Non-Final Office Action for U.S. Appl. No. 11/608,203, dated Aug. 23, 2010, 15 pages.
U.S. Patent and Trademark Office, Non-Final Office Action for U.S. Appl. No. 11/608,188, dated Sep. 1, 2010, 11 pages.
Fish & Richardson P.C., Amendment in Reply to Action for U.S. Appl. No. 11/608,189, dated May 12, 2010, 12 pages.
Fish & Richardson P.C., Amendment in Reply to Action for U.S. Appl. No. 11/608,189, dated Dec. 23, 2010, 9 pages.
U.S. Patent and Trademark Office, Final Office Action for U.S. Appl. No. 11/608,189, dated Mar. 17, 2011, 14 pages.
Fish & Richardson P.C., Amendment in Reply to Final Action for U.S. Appl. No. 11/608,189, dated Sep. 19, 2011, 13 pages.
Fish & Richardson P.C., Amendment in Reply to Action for U.S. Appl. No. 11/608,188, dated Jun. 8, 2010, 9 pages.
Fish & Richardson P.C., Amendment in Reply to Action for U.S. Appl. No. 11/608,188, dated Feb. 28, 2011, 8 pages.
U.S. Patent and Trademark Office, Final Office Action for U.S. Appl. No. 11/608,188, dated May 11, 2011, 12 pages.
Fish & Richardson P.C., Amendment in Reply to Final Action for U.S. Appl. No. 11/608,188, dated Sep. 1, 2011, 10 pages.
Fish & Richardson P.C., Amendment in Reply to Action for U.S. Appl. No. 11/608,203, dated Jun. 10, 2010, 12 pages.
Fish & Richardson P.C., Amendment in Reply to Action for U.S. Appl. No. 11/608,203, dated Jan. 18, 2011, 11 pages.
U.S. Patent and Trademark Office, Final Office Action for U.S. Appl. No. 11/608,203, dated Apr. 5, 2011, 13 pages.
Fish & Richardson P.C., Amendment in Reply to Final Action for U.S. Appl. No. 11/608,203, dated Oct. 5, 2011, 9 pages.
U.S. Patent and Trademark Office, Non-Final Action for U.S. Appl. No. 13/447,806, dated Nov. 6, 2012, 9 pages.
Rispoli, Joe, "Do you Have an Authoritative Website?", web.archive.org/web/20061116083642/http://ucanto.com/article-authoritative-site.html , Nov. 16, 2006, 2 pages.
Office Action issued in U.S. Appl. No. 11/608,189 on May 15, 2013, 18 pages.
Office Action issued in U.S. Appl. No. 11/608,203 on Jun. 21, 2013, 14 pages.
Office Action issued in U.S. Appl. No. 11/608,188 on May 15, 2013, 15 pages.
Office Action issued in U.S. Appl. No. 13/447,806 on Jun. 12, 2013, 11 pages.

* cited by examiner

CLASSIFYING CONTENT

RELATED APPLICATIONS

This application is related to the following applications, the disclosures of which are hereby incorporated by reference herein:

U.S. patent application Ser. No. 11/608,189, titled "RANKING CONTENT USING CONTENT AND CONTENT AUTHORS," filed Dec. 7, 2006;

U.S. patent application Ser. No. 11/608,203, titled "RANKING CONTENT USING CONTENT AND CONTENT AUTHORS," filed Dec. 7, 2006; and U.S. patent application Ser. No. 11/608,188, titled "RANKING CONTENT USING CONTENT AND CONTENT AUTHORS," filed Dec. 7, 2006.

BACKGROUND

This invention relates to text processing and more particularly, to determining the originality of content.

A search engine allows users to search for relevant documents contained in a corpus of documents. Typically, the search engine generates a list of documents in response to a search query. The order in which documents in the list of documents are presented is typically dependant on the relevance, or rank, of each document.

A particular document in the corpus can be ranked based on the extent to which other documents in the corpus reference the particular document. The explicit references (e.g., hyperlinks) of all documents in the corpus can be counted and recorded to determine the rank of a document. Counting the explicit references to a document does not capture whether the content of the document is unique with respect to the other documents. Some documents may contain identical or nearly identical content. Search results that include a document can also contain all of its copies or near copies. Even though each copy is a separate document, each copy actually provides little or no further information to information seeking users. The proliferation of search results that contain nearly identical content can obscure other search results that contain unique content.

SUMMARY

This specification discloses technologies for ranking a document based on the originality of its content. Embodiments feature methods, systems, apparatus, including computer program product apparatus. Each of these will be described in this summary in reference to the methods, for which there are corresponding systems and apparatus.

In general, one aspect of the subject matter described in this specification can be embodied in methods that include deriving a plurality of content pieces from a collection of documents, each piece occurring in one or more documents in the collection of documents. Each document in the collection of documents is associated with a time and an author. A first document in the collection of documents can be identified, the first document being the earliest document containing an occurrence of a first piece of content. A first author associated with the first document can be ranked based on a number of documents that contain at least one occurrence of the content piece and that are associated with an author other than the first author. Other embodiments of this aspect include corresponding systems, apparatus, and computer program products.

These and other embodiments can optionally include one or more of the following features. Deriving the plurality of content pieces can include translating each content piece in the plurality of content pieces into a single base language. A document in the collection of documents can be ranked based in part on the rank of an author associated with the document. The ranking can be inversely proportional to the age of the document. A copy history of the first content piece can be determined; and the first document can be classified based on the copy history of the first content piece. Determining the copy history of the first content piece can include determining a rate of copying of the first content piece for each of a plurality of intervals of time, the rate of copying in an interval based on a number of documents that both contain the first piece and are associated with a time within the interval. The classification can be one of news, blog or advertisement. The first author can be classified based on the copy history of the first content piece. The classification can be one of reporter, blogger or advertiser.

Particular embodiments of the invention can be implemented to realize one or more of the following advantages. Search results returned by the system are less likely to contain redundant, copied content, instead yielding results that refer to more interesting original content. The popularity of, or interest in, a piece of content can be determined without relying on explicit document referencing or citation. The likelihood that new content will be interesting can be anticipated based on the content author's historic propensity to produce original content. Content can be condensed into content pieces which can be of a predetermined length and can be translated into a common base language. The rank of a particular document (e.g., ranked based on explicit links to the particular document) which contains content copied from another document can be conferred to the other document (e.g., the document that originally contained the content).

Authors can be ranked based on the scores of associated content pieces, the number of original content pieces associated with the author, the number of copies of original content pieces associated with the author, the number of sources of content pieces copied by the author, the proportion of content pieces copied from another source. An author's rank can also be based on the rank of the author's documents. Documents can be ranked based on the rank of associated authors, based on the score of associated original content pieces, based on the number of sources of copied content, or based on the proportion of copied content. The collection of documents can encompass documents accessible on the World Wide Web. The frequency and depth of web document crawling can be based on the rank of an author.

The details of one or more embodiments of the invention are set forth in the accompanying drawings and the description below. Other features, aspects, and advantages of the invention will be apparent from the description and drawings, and from the claims.

BRIEF DESCRIPTION OF THE DRAWINGS

Like reference numbers and designation in the various drawings indicate like elements.

DETAILED DESCRIPTION

Figure 1:
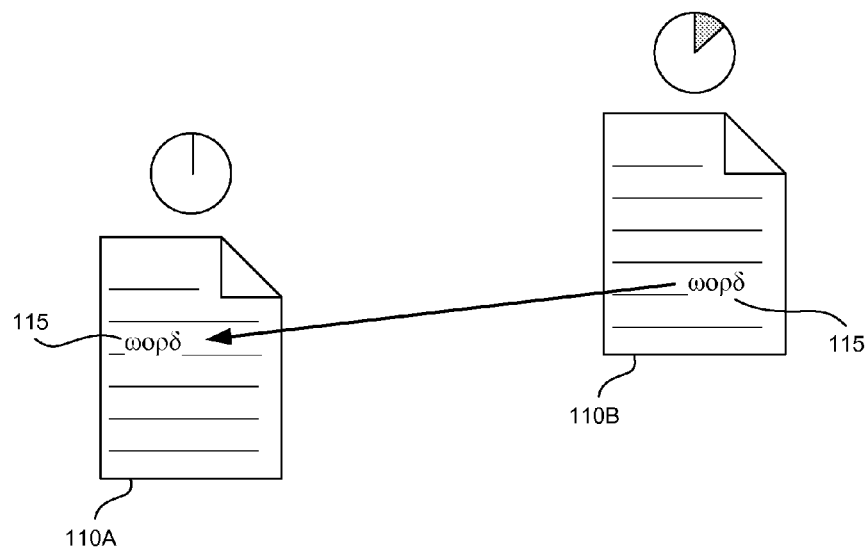
FIG. 1 illustrates two electronic documents, each associated with a point in time.

FIG. 1 illustrates two electronic documents 110A-B, hereafter referred to simply as documents, that are each associated with a respective time. Each document is typically encoded in one or more formats. For example, the documents can be HTML (Hypertext Markup Language) documents, PDF (Portable Document Format) documents, text documents, word processing documents (e.g., Microsoft® Word documents), Usenet articles, email messages, any other document containing content or a combination of these. Documents need not necessarily correspond to a file, instead a document can be stored in a portion of a file that may contain other documents or other content (e.g., images). For example, a file can contain multiple email messages which can each be considered a separate document despite being contained within a single file. Alternatively, a single document can be stored in multiple related files. In some implementations, a document can be a web page, file, or portion thereof, which is accessible on the World Wide Web.

In general, a document contains content. The content can be textual (e.g., letters, words, sentences, paragraphs or pages) or non-textual content (e.g., images, sound, video, electronic games, interactive content and combinations thereof). In general, the content, or portion thereof, of one document can be compared to the content, or portion thereof, of another document. Although this specification focuses on textual content, the description is provided by way of example and it is to be understood that the techniques that are described herein are applicable to and can be used with other types of content such as, for example, images, sounds, or multimedia content.

In addition to having content, each document is associated with a time. The time associated with a document can be expressed as a date (e.g., day, month, year) and a time (e.g., hour, minute, second). The way that time is expressed or stored can vary among implementations (e.g., seconds since an epoch, Gregorian calendar, or Julian date). The time associated with a document refers to when the document was published or created. In some implementations, the time can be determined from a time associated with the document or the file in which the document is contained (e.g., last-modified time, creation time or access time). The time can be an approximation of the publication time based on when the document is first encountered or discovered (e.g., by a web crawler that accesses documents found on the Web). In one implementation, the time associated with a document reflects when the document was added to a corpus of documents.

Each of the documents 110A-B depicted in FIG. 1 can be a document in a corpus of documents. The corpus of documents is a collection of documents that typically contains many (e.g., thousands or millions) documents or references to documents. Any other documents in the corpus, if any, are not depicted in FIG. 1. Documents can be added to the corpus over time. In some implementations, where the time associated with a document reflects when it was added to the corpus, each added document is thus associated with a later time than the time associated with the documents already in the corpus. In other implementations, however, the added document can be associated with a time that may be earlier than the time associated with other documents in the corpus (e.g., in implementations where the time indicates the actual time of publication or creation).

In FIG. 1, for example, a document 110A is added to the corpus at, and associated with, a first point in time. Another document 110B is added later at a second point in time. When a document is encountered or added to the corpus, the document's contents can be compared to the contents of documents already in the corpus to determine whether content in the added document is the same as any of the content already contained in the documents of the corpus. For example if the corpus formerly contained only document 110A, the text content of document 110A can be compared to the text content of document 110B. If some of the same text appears in both documents, then the two documents contain some of the same content. In particular, 'ωopδ' 115 refers to a portion of content that is contained within both documents. The portion of content can include, for example, a series of words, a sentence, a paragraph, page of content or all of the content that can be found in the document.

Of the two documents 110A and 110B, the earlier document 110A is assumed to be the earliest occurrence of the content, while the later document can be assumed to be a partial copy of the earlier document. The particular portion of content 115, can be said to be original when referring to the content's earliest occurrence (e.g., document 110A), while the same portion of content 115 can be said to be copied if referring to the content's occurrence in any other document (e.g., document 110B). Document 110A is considered the source of the copied content in document 110B because the content piece does not occur in any earlier document. In general, a portion of content that occurs in multiple documents is original in the document associated with the earliest date. In all later documents, the content is assumed to have been copied from the earliest document, even if the content may not, in fact, have been copied (e.g., when the same content is independently created on two or more occasions).

The extent of content copying by one document of another document's content can depend on a variety of characteristics including: a score of each content piece, the number of documents content was copied from and the proportion of content of the other document that was copied. The extent of copying can be used to rank the copier as described in reference to FIG. 3.

Figure 2:
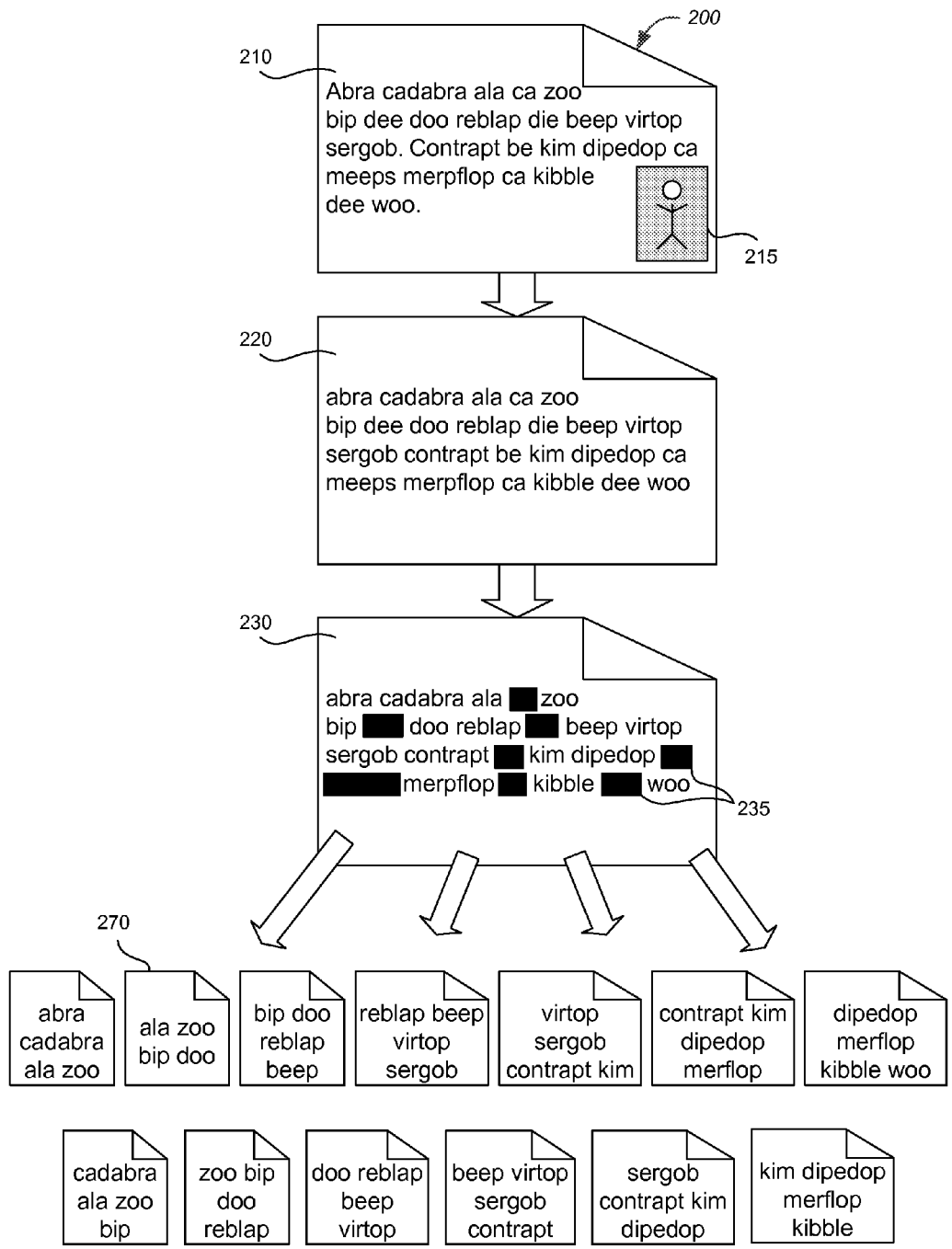
FIG. 2 illustrates generating content pieces from the content of a document.

FIG. 2 illustrates generating content pieces 270 from the content 210 of a document 200. The document 200, for example a web page accessible on the Web, contains content 210 which includes words, sentences, paragraphs, punctuation, and images 215 or other attending data. Content in the document can be extracted, isolated or analyzed. Among implementations supporting textual content, the non-textual content can be removed or ignored. For example, the textual content of the document can be extracted while omitting other attending data (e.g., images or formatting). In some implementations extracting content can also include standardizing the content. For example, to standardize the content text can be recapitalized, punctuation removed, encoding converted, characters transliterated, or combinations of these. The content 220 is the standardized content of the original content 210 from the document 200.

In some implementations, content can be condensed. For example, so-called 'stop' words can be omitted or ignored before, during or after fragmentation of the document's content. Stop words are words that are commonly found within the entire content of the corpus. For a corpus that contains documents from several languages, the stop words can include frequently used words from each language. In some implementations, the top 500 most commonly found words in each known language are considered stop words (e.g., in English language documents, 'and', 'the', 'it' and others). The portion of words in a language that are considered stop words can vary among implementations. In some implementations, the number of stop words can be determined dynamically based on a statistical analysis of a sample of documents known to be in a given language (e.g., the most commonly used one-percent of words). The content 230 is condensed standardized content of document 200. Several words 235 in the content 230 are shown blacked-out. Each black-out indicates that the covered word is a stop word and will be omitted, or ignored.

The content of a document can be fragmented into pieces. Each piece of content contains a portion of the content from the document. In some implementations, a document is fragmented by splitting the content of the document into pieces containing a predefined number (e.g., four) words, for example. For example, from the non-stop words contained in document 200, 13 content pieces 270 are created. Each content piece 270 contains four consecutive words from the content 230.

By way of further illustration, consider the following passage:

Throw your soldiers into positions whence there is no escape, and they will prefer death to flight. If they will face death, there is nothing they may not achieve.

The above passage can be fragmented into the following condensed 9 four-word pieces, "throw soldiers positions whence", "soldiers position whence escape", "position whence escape prefer", "whence escape prefer death", "escape prefer death flight", "prefer death flight face", "death flight face death", "flight face death nothing", "face death nothing achieve", assuming that all omitted words are stop words. If this passage occurs in another document, then fragmentation yields another instance of the same 9 four-word pieces will result.

Each content piece contains words in the same order as found in the document. In some implementations, the content of each piece does not span paragraphs. Paragraphs can be identified in a document by delimiters found in the document. For example, in HTML, tags such as '<BR>', '<P>', '<H1>' can be used to delimit paragraphs; in an ASCII text file, a paragraph can be delimited by a carriage return or a line feed. In some implementations, content pieces created from the end of paragraphs that contain less than the pre-defined number of words can be ignored.

Figure 3:
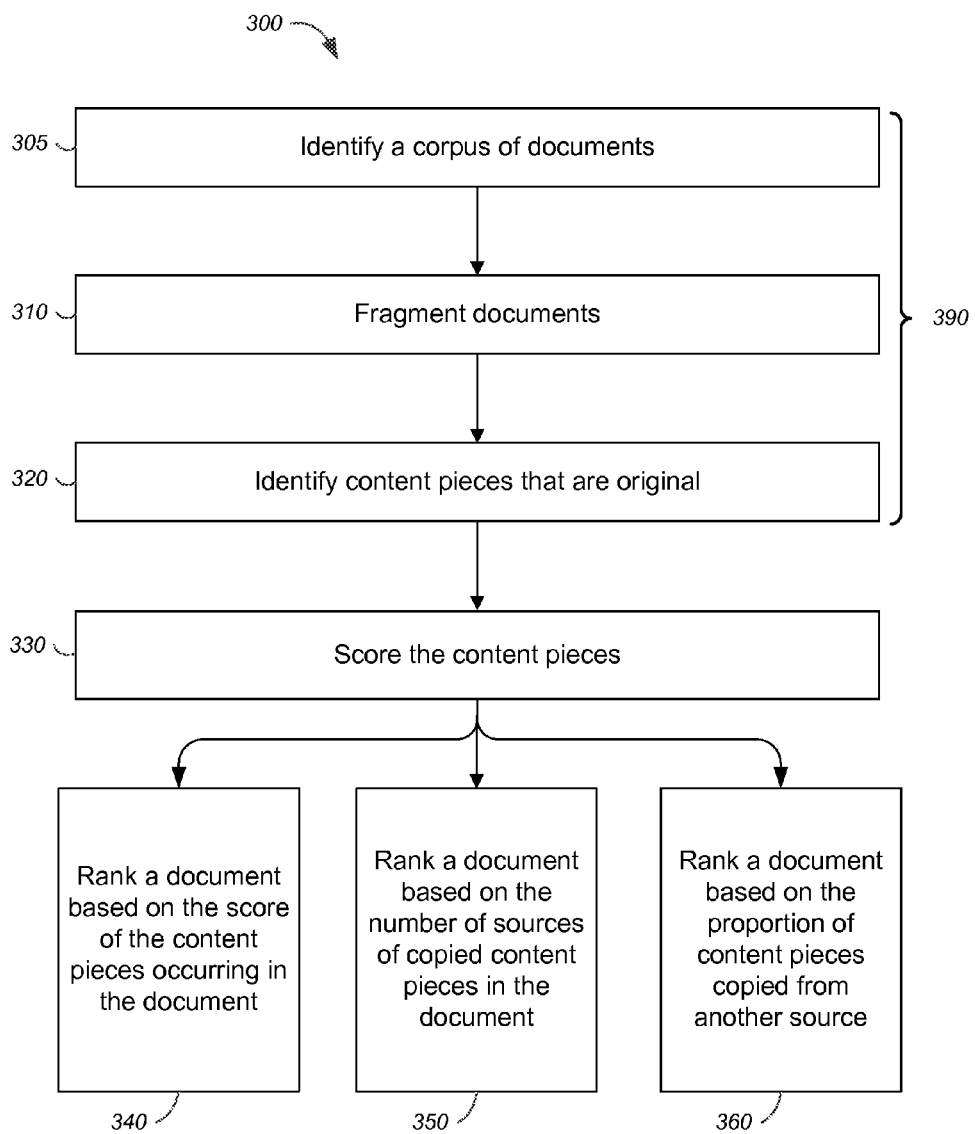
FIG. 3 is a flow diagram for ranking a document based on its content pieces

FIG. 3 is a flow diagram of a process 300 for ranking a document based on its content pieces. The process 300 includes identifying a corpus of documents (step 305). For example, a corpus of documents referring to web pages accessible on the Web could be identified. In other implementations, a remote repository of documents (e.g., a network drive, a database or another content source) can be identified as a corpus of documents.

Each document in the identified corpus of documents can be fragmented into content pieces (step 310). Each of the documents in the corpus can be fragmented as described in reference to FIG. 2, for example. The process 300 includes identifying the earliest occurrence of each content piece to determine, for any particular document, which of the document's content pieces are original (step 320). In some implementations, the content pieces of the document can be compared to, and recorded in, a repository (e.g., a list, datastructure or database) of known content pieces that appear in earlier documents. For example, a document's content pieces can be compared to the repository to determine whether any of the document's content pieces are original. If a content piece has not already been recorded in the repository, then the content piece has not occurred in any earlier document.

The repository of content pieces can also include attending information about each content piece such as the time of the earliest occurrence of the piece and a record of the piece's occurrences in subsequent documents. In some implementations, the repository is persistent (e.g., stored on a storage device). As documents are added to the corpus, their content pieces are used to update the repository. For example, when encountering an original content piece within a document, a record of its appearance is added to the repository. The document's other content pieces can also be used to update the repository (e.g., update the record of occurrences for other content pieces).

In some implementations, fragmenting documents or identifying original pieces can include translating each piece into a common base language. The base language can be any natural language for which translation is possible. The translated piece can be used to determine whether content from the document has occurred in any earlier document in any language. For example, if two pieces of content contain words in two different languages, then the two pieces may contain the same conceptual content. Consider that the English piece "boy girl dog cat" and the French piece "garcon fille chien chat", each contain different words. By translating one piece to the other's language, both pieces can be compared to one another. A particular piece can yield one translated piece or several translated pieces in the base language, depending on whether translation of the piece yields multiple potential translations. Alternatively, rather than translating each piece, a document can be translated before fragmentation. To determine whether a particular piece is original, the piece and all of its potential translations are compared to all pieces in the same base language. For example, if the piece "boy girl dog cat" is translated into "garcon fille chien chat" and vice-versa, then only one of the pieces in the above example can be an original piece of content. The piece associated with the earlier time (e.g., that occurs in the earlier document) is considered the earlier of two occurrences.

The process 300 can include scoring each of the document's content pieces (step 330). A document's content piece can be scored based on whether the content is original or not. For example, if an original content piece occurs in the document, then the piece, with respect to the document, can be scored highly (e.g., a score of one). In contrast, if the content piece has occurred earlier, then it can be scored neutrally or negatively (e.g., a score of zero or −1 respectively). The particular numerical value used to score a piece can vary among implementations. A content piece can also be scored based on the number of other documents that the content piece later occurs in. For example, the earliest occurrence of a content piece can be scored in proportion to the number of later documents the content piece occurs in.

In one implementation, a content baseline can be determined by specifying a threshold date. Any content pieces occurring in a document associated with a time before the threshold date are part of the content baseline. Content pieces in the content baseline are considered neither original nor copied. Pieces in the content baseline capture commonly used phrases or particular quotations that are widely recited. Pieces contained in a later document (e.g., with a later time) but which can be found in the content baseline are not considered copied. For example, if the piece "mother wears army boots" occurs in the content baseline, then the piece occurs in a document whose time is earlier than the specified baseline threshold date. If the same piece occurs in a later document (e.g., associated with a time later than the threshold date), then the content piece would not be scored, or scored neutrally. Establishing a content baseline can be particularly useful when it is difficult to establish authorship of existing content, for example, when adding pre-existing content to initially populate an empty corpus.

The process 300 can include using the score of a document's content pieces to rank the documents in the corpus (step 340). In one implementation, the score of each content piece in the document can be summed, averaged or otherwise combined to produce a total score for the document. The total score can be used to rank the document based on its content pieces. For example, a document's rank can be improved for each piece of content that occurs first in the document (e.g., based on the piece's score). In contrast, a document's rank can be reduced if the document contains only copied content pieces. Referring to FIG. 1, the document 110A contains original content and can be ranked more highly than document 110B, which contains no original content. Improving the rank of documents that contain original content recognizes that original content is typically of more interest to information seekers.

As described above, the score of a content piece can also capture how extensively the original content of a document has been copied by, or occurs in, other documents. Thus, ranking a document based on the score of its content pieces can be used to recognize documents whose original content has been copied. For example, in FIG. 1, the rank of document 110A can be [further] improved because the content piece 115 has been copied by another document 110B. Improving the rank of documents that contain original content that has been copied recognizes that content is typically copied when it is of interest or significance to others.

Alternatively, the process 300 can include ranking a document based on the number, or extent of distribution, of sources of content pieces copied in the document (step 350). The source of a copied content piece refers to the document that the piece first occurred in. For example, a document that contains copied content from many other documents can be more highly ranked than a document that has copied original content from only one document. Documents that have copied portions of original content from many documents may be providing relevant content aggregation (e.g., making content recommendations, analysis or review).

In a further alternative, the process 300 can include ranking a document based on the proportion of content copied from another source document (step 360). In particular, a document's rank can be worsened in proportion to the relative entirety of content copied from another document. For example, the rank of a document that has copied all of another document's original content can be penalized more than another document that copies only a small portion of the other document's original content. Documents that have completely copied the content from another document or copied content from only one document are less likely to be merely quoting content from the content's original source. In some implementations, if the original content from a first document is copied into one or more second documents, then the rank of the secondary documents (e.g., the rank based on explicit references) can be used in determining a rank for the first document. Thus, although each reference may actually refer to one of the secondary documents, the first document can be ranked based on each of the references because all of the secondary documents implicitly refer (e.g., by copied content) to the first document.

Figure 4:
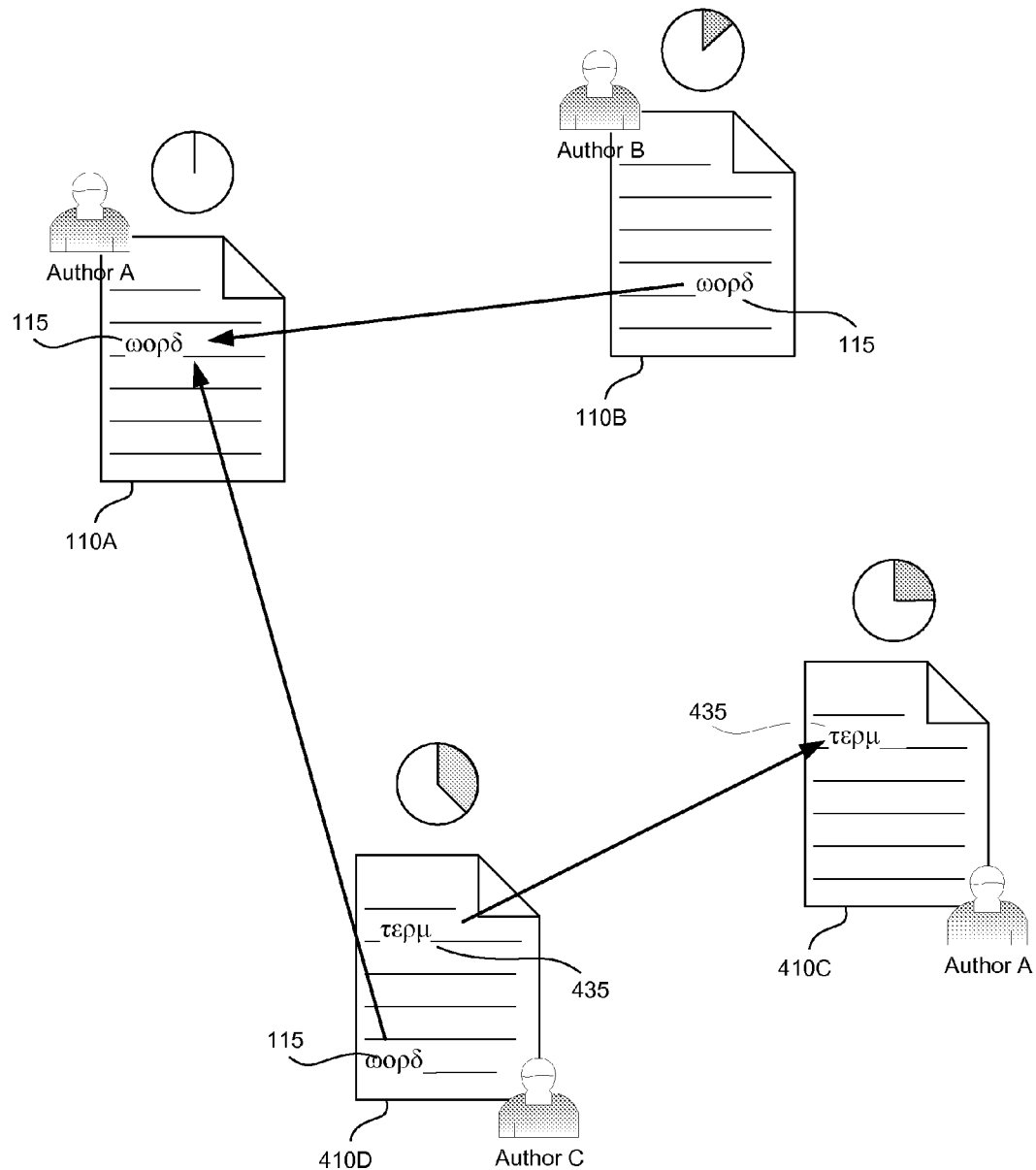
FIG. 4 illustrates the two documents, shown in FIG. 1, and two additional documents.

FIG. 4 illustrates the documents 110A-B and 410C-D that have each been added to a corpus at four respective points in time. Additionally, each document in the corpus is also illustrated as being associated with a respective author. Author A is associated with document 110A and document 410C. Author B and Author C is associated with document 110B and 410D respectively. The document 110B contains a content piece 115 copied from document 110A and the document 410D contains content piece 115 and piece 435 copied from documents 110A and 410C respectively.

The author of a document can refer to the factual creator of the document and its content. However, when, for example, the factual authorship of the document cannot be reliably established, alternative information can be used to identify an author of the document. For example, the author of a document can refer to the username of the user who created or last modified the file containing the document. In some implementations, the documents of an author can be analyzed to determine (e.g., learn) content patterns that are distinct to the particular author (e.g., word choice, unique content patterns and stylistic or structural similarities). The content of other documents can be analyze content patterns and to determine the likelihood that an author is the author of a document based on matching content patterns of the author and the document.

Alternatively, among implementations where each document in the corpus is retrieved (e.g., by a crawler) from an addressable location (e.g., from a storage device, storage repository, database, network device or the Web), the document's author can refer to all or part of the document's location. The location of a document can be specified by a unique name, address or Universal Resource Locator (URL). The URL can minimally include a server name, typically a domain name, and the document's name. The URL can also include subdomains and a path referring to the location of the document with respect to the server. For example: 'http://subsubdomain.subdomain.domain.com/path/document.html'.

In one implementation, the author of the document refers to the server name or the domain specified by the document's URL. For example, the author for the document at the URL in the example above can be: "domain.com". Deriving the author from a URL can also include subdomains and paths from the URL depending on the specificity of authorship that is desired. For example, for a server with many documents it can be desirable to distinguish authorship to according to whether the document came from 'beeslotsofdocs.com' or 'knees.lotsofdocs.com'. Alternatively, documents originating from a domain with relatively few documents can attribute all documents to the same author. For example, documents found at 'resume.homepage.com' and 'about.homepage.com' can both have their authorship attributed to 'homepage.com'.

In general, a particular author can be associated with many documents in the corpus. For example, in FIG. 4, both document 110A and document 410C are associated both with author A and the content of each document can be attributed to that author. In particular, both pieces of original content, content 115 and content 435, in each document (e.g., 110A and 410C, respectively) can both be attributed to the author A. The author associated with a document that is the earliest occurrence of a content piece is assumed to have authored the content piece. If the content piece occurs in a later document, the author can be assumed to have copied the content piece from the earlier document (and the previous document's respective author) in which the content piece first occurred. In FIG. 4, the document 410C, added at a third point in time, contains a piece of content that has not occurred in any prior document, exemplified as 'τερμ' 435. Document 410D, added at a fourth point time, contains at least two pieces of content. The document 410D contains both piece 435 and piece 115.

Just as documents can be ranked, so too can authors be ranked. An author can be ranked according to the content in documents that are associated with the author. Ranking an author based on the authors' content can be analogous to ranking a document based on the documents' content. An author can be ranked based on the pieces of content contained in the documents associated with the author. In some implementations, the ranking is based on the score of the pieces. In other implementations the ranking is based on the quantity of the pieces. In some implementations, an author can be ranked in proportion to how many original pieces of content are attributed the author. For example, Author A who is attributed to two pieces of original content, piece 115 and piece 435, can be ranked more highly than either Author B or Author C, who are not attributed to any original content.

Figure 5:
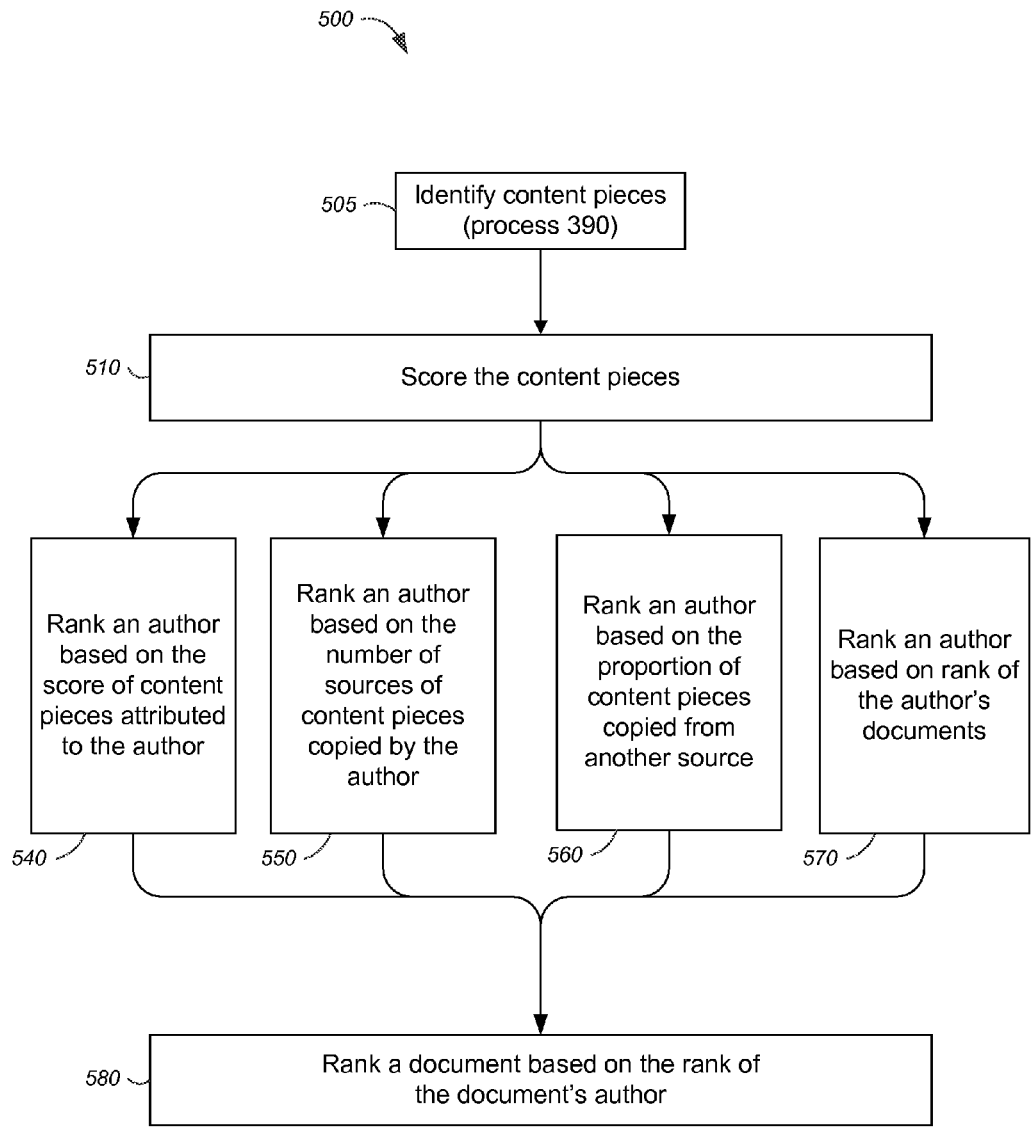
FIG. 5 is a flow diagram for ranking an author based on content pieces.

FIG. 5 is a flow diagram of a process 500 for ranking an author based on content pieces contained in documents associated with the author. The process 500 includes the sub process 390 for identifying a corpus of documents, fragmenting each document, and identifying original content pieces, as described in reference to FIG. 3.

The process 500 includes scoring each content piece with respect to an author (step 510). In some implementations, each piece can be scored with respect to each document the piece occurs in, as in step 330 (see FIG. 3). In other implementations, each piece is scored with respect to each unique author the piece is attributed to (e.g., each author of the documents that the piece occurs in). The piece can be scored based on whether or not an author is associated with the earliest occurrence of the content piece. For example, referring to FIG. 4, the content piece 115 in document 110A, with respect to author A, can be given a positive score (e.g., a score of one) because the piece's earliest occurrence is in a document attributed to author A. The same content piece 115 in document 110B, with respect to author B, can be given a neutral or negative score (e.g., zero or −1 respectively) because the piece's earliest occurrence is in a document not attributed to author B. Scoring the content pieces in this manner rewards authors of original content (e.g., author A) and penalizes authors of copied content (e.g., author B).

The original content piece of an author can be further scored in proportion to the number of other documents attributed to other authors that the content piece occurs in. For example, in reference to FIG. 4, the score of content piece 115 can be improved by two for each of the two other documents 110B and 410D in which the content piece 115 occurs because both documents are attributed to an author other than author A. Alternatively, the piece can be scored in proportion to the number of other authors that the content piece has been copied by. In the previous example, if documents 110B and 410D had been authored by the same author, the content piece could be improved by one, since only one author copied content piece 115, albeit into two separate documents.

The process 500 can include ranking an author based on the score of the scored content pieces (step 540). In one implementation, the score of each content piece attributed to the author can be summed, averaged or otherwise combined to produce a total score for the author. In some implementations, the total score can be based on the number of documents attributed to the author. The total score of an author can be used to rank the author. For example, to reward authors who produce content across several documents, rather than original content in a single document, the total score of author can be multiplied by the number of documents that contain original content and are attributed to the author.

The process 500 can include ranking an author based on the number, or extent of distribution, of sources of content pieces copied by the author (step 550). For example, in some implementations, an author's rank can be improved if the author has copied content from many other documents rather than from a single document (e.g., as might occur if the author aggregates portions of content from many sources into a single document). In other implementations, an author's rank can be improved if the author has copied content from many other authors rather than from the documents of a single author.

The process 500 can include ranking an author based on the proportion of content copied from another source (e.g., another author or document) (step 560). For example, an author that copies all of the original content from a document would be ranked lower than an author that copies only part of the original content from the same document. Such ranking recognizes that an author who merely includes a small quote from an original document may be more interesting than an author who copies the entire contents of another document.

The process 500 can include ranking an author based on the rank of the author's documents (step 570). The rank of a document can be based on the originality of the document's content, as described above in reference to FIG. 3, or a document can be ranked based on characteristics of the document that can take time to develop or measure. For example, a document can be ranked based on whether other documents explicitly reference the document (e.g., by hyper-linking) or based on positive recommendations by other processes, systems or users. In some implementations, the rank of a document is based on a combination of rankings Ranking an author based on the rank of documents that are attributed to the author recognizes the author's content according to the evaluation metric captured by the document's rank.

In some implementations, an author can be ranked based on one or a combination of the aforementioned methods (e.g., step 540-570).

Process 500 can include ranking a document based on the rank of the author associated with the document (step 580). For example, a document's rank can be improved if the document is associated with an author that is highly ranked. Ranking a document based on its author anticipates the relevance of the document based on the author's history of producing original or relevant content. Presumably an author who has in the past authored original, interesting or otherwise highly ranked content is likely to author interesting and original content in the future.

The rank of a document or an author can be determined repeatedly over time as documents are added to the corpus of documents. Over time the rank of both documents and authors can change. For example, as original content from a particular document appears in newly added documents, the rank of the particular document can improve. Likewise, the rank of an author can change as documents associated with the author are added to the corpus. An author's rank can also change in response to the changing rank of existing documents associated to the author.

In some implementations, the rank of an author can also be affected by only the passage of time (e.g., assuming the corpus and its content is otherwise unchanged). In particular an author's rank can decay over time. Rank decay can reward (or penalize) authors who produce (e.g., are attributed to) original content pieces over a long period of time compared to the same original content appearing over a short period of time.

In other implementations, a probabilistic ranking model can be determined for a document. The probabilistic ranking model determines the likelihood of a document's rank based on when the document's original content is copied and based the age of the document. For example, if the content of a document is copied shortly after it is published (e.g., the documents associated time), the probabilistic ranking model can predict that the document is very good but with a low degree of certainty. In contrast, if the content of a document is copied only once long after it has been published, the probabilistic ranking model can predict that the document is not very good with a higher degree of certainty.

In other implementations, ranking a document based on the rank of the document's author can also depend on the passage of time. For example, a new document (e.g., a document that is associated with relatively recent time compared to other documents in the corpus) can be ranked entirely based on the rank of the document's author. Ranking a new document based on the rank of its author does not rely on measuring response to the document (e.g., links to the document or copying of the document's content); rather the new document is ranked merely based on the rank (e.g., reputation, or historical record) of the new document's author. As time progresses the effect of the author's rank on the document's rank can decay. However, the rank of the document may not change in proportion to the decay. For example, over a period of time the document's rank may improve despite the decay because the document's rank has been improved for other reasons (e.g., original content from the document has been copied or other documents have explicitly referenced the document). Decreasing the effect of an author's rank on a document's rank over time recognizes that although the author has a history of producing highly (or poorly) ranked content, the document can eventually be ranked on its author-independent characteristics (e.g., copied content, explicit references).

Figure 6:
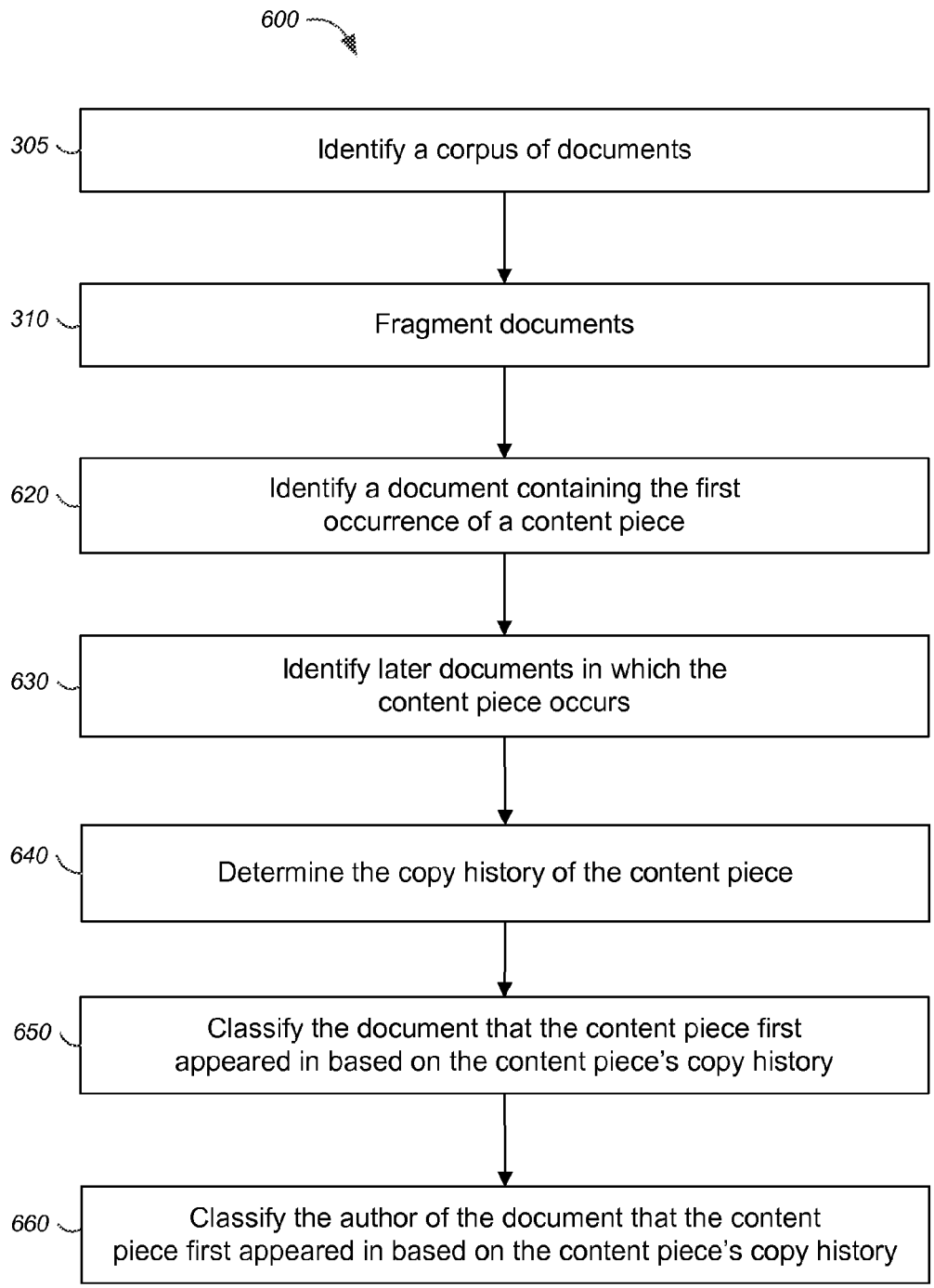
FIG. 6 is a flow diagram for classifying an author or document based on copied content.

FIG. 6 is a flow diagram for a process 600 for classifying an author or a document based on the rate at which a piece of content is copied. The rate at which a particular piece of content is copied refers to the number of times a content piece is copied in a particular time interval. The process 600 includes identifying a corpus of documents and fragmenting the documents in the corpus (steps 305 and 310, as described in reference to FIG. 3). The process 600 also includes identifying a document containing the first occurrence of a content piece (step 620) and later documents (e.g., copying documents) in which the content piece also occurs (step 630). For any particular content piece, its rate of copying refers to the number of documents the content piece appears in over specific intervals of time (e.g., hours, days, weeks, months).

Process 600 includes determining the content piece's copy history (step 640). The copy history of a content piece refers to the content piece's rate of copying over time (e.g., a record of how often and when an original content piece occurs in subsequent documents). A content piece's copy history can be used to determine how quickly the content is disseminated. For example, if original content is created on Tuesday, it may appear in another document on Wednesday, another four documents on Thursday and fifteen more documents on Saturday. On Sunday the same content may only appear in seven more documents. In this example, the rate of coping steadily increases over time, reaches a peak on Saturday and then its rate of copying falls.

Figure 7:
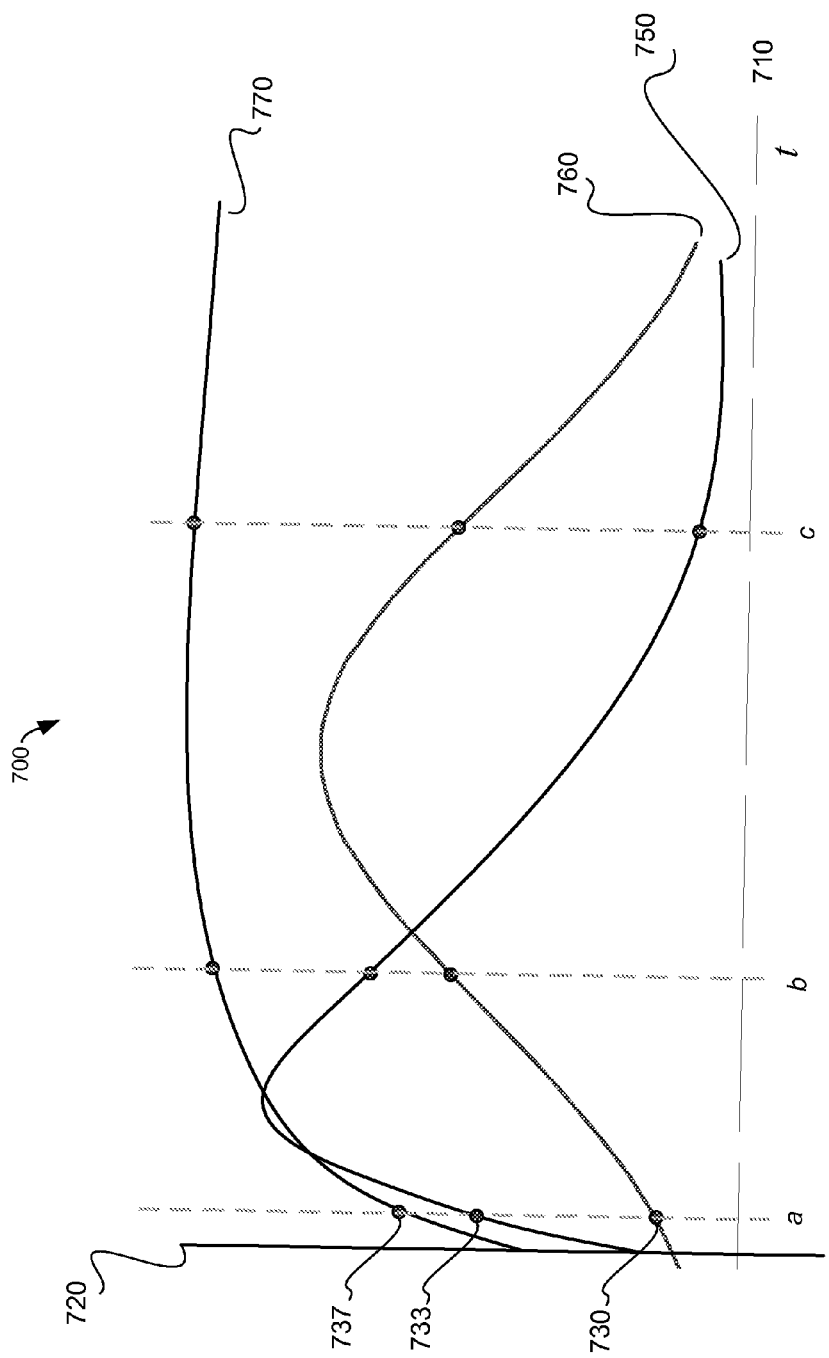
FIG. 7 illustrates three copying patterns plotted in a graph.

The process 600 includes classifying documents based on the content piece's copy history (step 650). A piece of content's copy history can be compared with predefined patterns to classify the piece of content, the document that the content occurs in, and the author the document is associated with (step 660). Each pattern generally describes a trend of copying over time. The classification of documents or authors can characterize the content contained in the document or attributed to the author. In FIG. 7, three copy patterns are given to illustrate three separate and distinctive patterns of copying.

FIG. 7 illustrates three copying patterns (e.g., lines 750, 760 and 770) plotted in graph 700. Each line 750, 760 and 770 correspond to a different original content piece. A line's path in the graph describes the rate of copying 720 over a range of time 710. The particular range of time 710 used (e.g., minutes, hours, days, weeks, months or years) can vary among implementations and can depend on the anticipated copying patterns, content type, and frequency of document additions to the corpus. Over the range of time, three data samples are illustrated 710A-C. For example, the first data sample 710A is early in time relative to the total range of time over which the copy patterns are plotted in graph 700. The data points at the first point in time 710A, represents the rate of copying at that particular point in time. For example, the data point 730 represents a low rate of copying compared to data point 733 or 737 (e.g., three occurrences per hour compared to 20 or 25 occurrences per hour respectively).

The line 750, for example, plots content that appears, then very quickly occurs in many other documents and then occurs only rarely in subsequent intervals (e.g., as evident from copy data at time 710C). This copy pattern can indicate that the original content is syndicated content (e.g., such as a news article). Syndicated content is widely and regularly distributed for near simultaneous publication by multiple content publishers. The document in which the original content is contained can be classified as a syndication source. The author of the document can also be likewise classified as a source of syndication content, particularly if the author is associated with other documents that are similarly classified.

The line 760 plots content that is increasingly copied over time and then, at some later interval, copying gradually falls off (e.g., in the shape of a bell-curve). This copy pattern can indicate that the original content is interesting, but has taken time to disseminate or to be recognized by others. On the Web, this sort of content is frequently produced by bloggers or other semi-formal content producers.

The line 770 plots a copy history that indicates immediate dissemination of content, similar to news content, but unlike news content, continues to be occur in new documents over an extended period of time (e.g., at time 710B and 710C). Such content may be consistent with advertising content.

A piece of content's copy history can be used to classify documents into distinct groups including: news, advertising, and informal news/editorial (e.g., blogging). These copy patterns, and others, can be used to classify a content piece, the earliest document in which the piece occurs, the documents that have copied the piece, and the authors of each document. For example, a document can be classified as 'news' if it contains the earliest occurrence of a piece that has a copy pattern consistent with news content. The document's author can be classified as a 'news source'. Documents that contain copies of the content can be classified as 'news report'. Documents that contain copies of multiple such pieces can be classified as 'news aggregators'. In another example, a document can be classified as a 'blog source' if it contains the earliest occurrence of a content piece that has been classified as blog material. The document's author can be classified as a 'blogging leader', while the author of documents containing copies of the piece can be classified as 'blogging follower'. Other classifications are possible.

Document and author classification can also be used while ranking authors and documents. In some implementations, the classification of a document or author can be used to affect their respective ranking For example, if a document contains a high proportion of pieces classified as 'advertisements' then its rank can be penalized. Likewise, the rank of an author classified as a 'blog leader' can be improved.

Document and author classification can also be used to enhance a user's ability to search the corpus. In some implementations, users are allowed to constrain their search results by specifying a desired classification. For example, a user can be allowed to specify that search results include only the content classified as blog material. Users can also be allowed to constrain search results by specifying a threshold of popularity determined based on the content's rate of copying.

Figure 8:
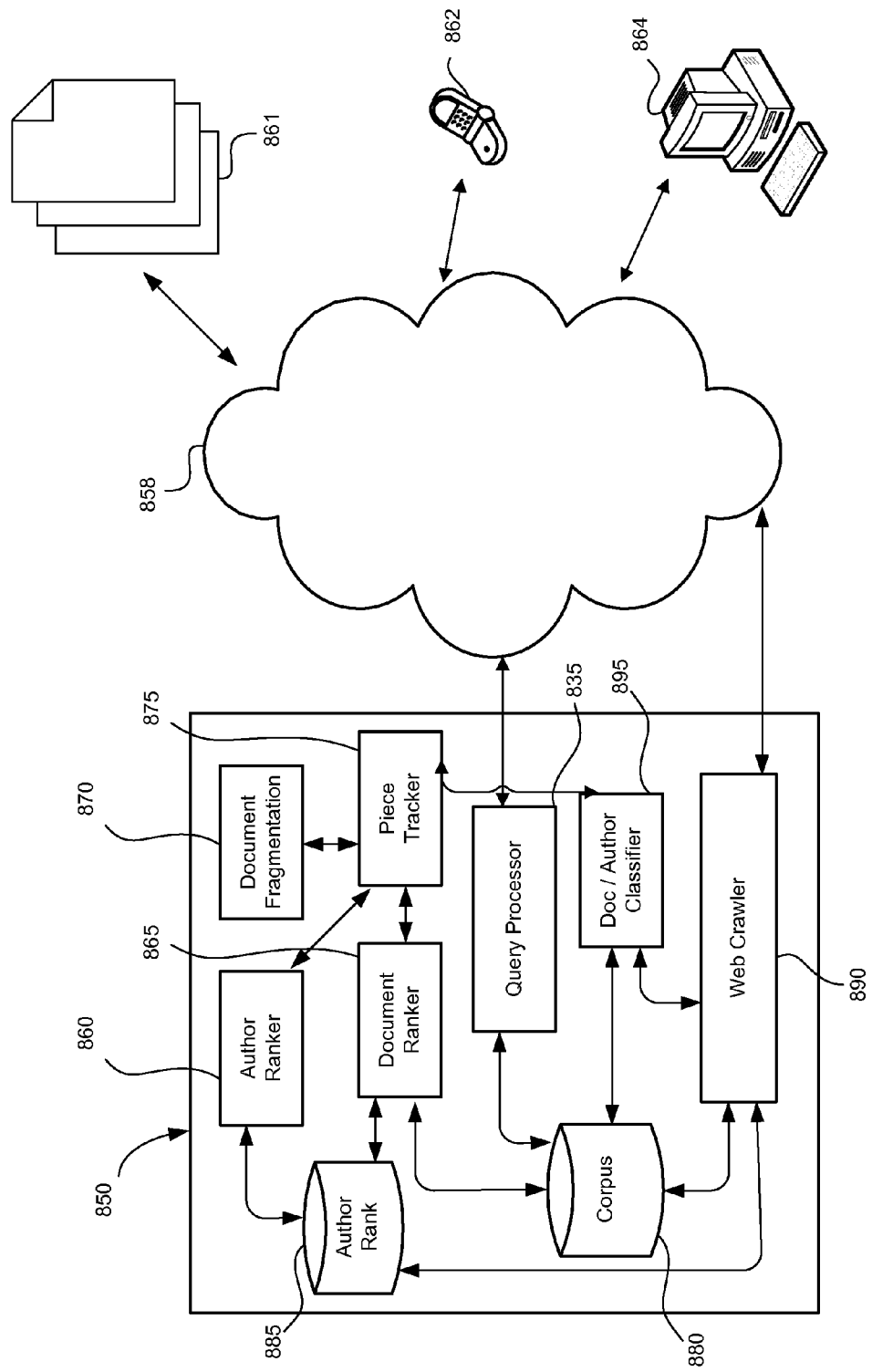
FIG. 8 is a schematic diagram of a search engine.

FIG. 8 is a schematic diagram of a search engine 850. The search engine generally relies on a number of other components for its proper operation. The document fragmentation module 870 accesses documents in the search engine's corpus of documents 880 and fragments each document into pieces of content. The piece tracker 875 records each piece including the earliest document the piece occurred in and the document's author. The piece tracker 875 can also track subsequent documents the piece appears in and each document's respective author. In some implementation, information about each piece can be summarized, including the number of times a particular piece has been copied, or the number of copied or original pieces contained in a document or attributed to an author. The piece tracker 875 can also track the rate at which each original piece of content is copied.

Information provided by the piece tracker 875 can be used by both the author ranker 865 and the document ranker 860 to rank documents in the corpus of document 880 according to the originality of each document. The rank of each document can be stored with each document in the corpus of documents 880. The rank of each author can be stored in a corpus of authors 885 that records each authors and the author's associated rank.

The system 850 can include a document and author classification module 895 that uses information in the piece tracker 875 to classify authors and documents.

In some implementations, the corpus of documents 880 is populated by a document retriever component 890. The document retriever 890 continuously or repeatedly retrieves documents and adds them, or references to them, to the search engine's corpus 880. For example, the document retriever can be a web crawler. In some implementations, the document retriever 890 can be guided by the rank of authors 885. In implementations where the author of a document is the document's location, the document retriever can retrieve documents more frequently and at a greater depth from the authors that are highly ranked. The document retriever 890 can also be guided by the authors that are classified by the document and author classifier 895. The document retriever 895 can retrieve new documents from authors that have particular predefined classifications. The particular classifications can indicate that the author is likely to produce relevant content on a regular basis (e.g., 'news' authors).

The search engine 850 can be connected to one or more networks such as the Internet 858 and can communication with various devices connected to the Internet such as wireless communication devices 862 and personal computers 864. The communication flow for any devices can be bidirectional so that the search engine 850 receives information (e.g., queries) from the devices and can also send information (e.g., results) to the devices. Queries received by the search engine 850 can be processed and answered by the query processor 835. The search engine 850 can also retrieve documents 861 that are available on the network 858. In one implementation, the document retriever component is a web-crawler that retrieves documents from the Web.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A method performed by data processing apparatus, the method comprising:
    fragmenting a document into a plurality of content pieces, each of the content pieces representing a number of consecutive words in the document, the document having a date of creation and an author;
    comparing the document's content pieces to a repository of stored content pieces that occur in a first corpus of documents, each document of the first corpus having a date that is earlier than the date of the document and an author that is not the same as the author of the document;
    determining that one or more of the document's content pieces does not match at least one of the stored content pieces;
    in response to determining that one or more of the document's content pieces does not match at least one of the stored content pieces, determining that the one or more content pieces are original content pieces, wherein an original content piece is a content piece that has not occurred in the first corpus of documents;
    determining a rate of occurrence over time of the one or more content pieces in a second corpus of documents, wherein determining the rate of occurrence comprises determining the rate of occurrence over time of the one or more content pieces for each of a plurality of time intervals, the rate of occurrence over time of the one or more content pieces in an interval based on a count of a number of the other documents that both contain the first content piece and are associated with a time within the interval, each document of the second corpus having a date that is later than the date of the document and an author that is not the same as the author of the document;
    comparing the rate of occurrence over time of the one or more content pieces to predefined copying patterns that are each associated with a different document classification;
    selecting a document classification that is associated with a predefined copying pattern that is most consistent with the rate of occurrence over time of the one or more content pieces; and
    associating the selected document classification with the document.

2. The method of claim 1 wherein fragmenting the document into the plurality of content pieces further comprises translating each content piece in the plurality of content pieces into a single base language.

3. The method of claim 1, wherein the document classification is one of news, a blog and an advertisement.

4. The method of claim 1, further comprising associating an author classification with the document's author based at least partly on the rate of occurrence over time of the one or more content pieces in the second corpus of documents.

5. The method of claim 4, wherein the author classification is one of reporter, blogger and advertiser.

6. A non-transitory computer readable medium having stored therein instructions, which, when executed by one or more processors, causes the one or more processors to perform operations comprising:

fragmenting a document into a plurality of content pieces, each of the content pieces representing a number of consecutive words in the document, the document having a date of creation and an author;

comparing the document's content pieces to a repository of stored content pieces that occur in a first corpus of documents, each document of the first corpus having a date that is earlier than the date of the document and an author that is not the same as the author of the document;

determining that one or more of the document's content pieces does not match at least one of the stored content pieces;

in response to determining that one or more of the document's content pieces does not match at least one of the stored content pieces, determining that the one or more content pieces are original content pieces, wherein an original content piece is a content piece that has not occurred in the first corpus of documents;

determining a rate of occurrence over time of the one or more content pieces in a second corpus of documents, wherein determining the rate of occurrence comprises determining the rate of occurrence over time of the one or more content pieces for each of a plurality of time intervals, the rate of occurrence over time of the one or more content pieces in an interval based on a count of a number of the other documents that both contain the first content piece and are associated with a time within the interval, each document of the second corpus having a date that is later than the date of the document and an author that is not the same as the author of the document;

comparing the rate of occurrence over time of the one or more content pieces to predefined copying patterns that are each associated with a different document classification;

selecting a document classification that is associated with a predefined copying pattern that is most consistent with the rate of occurrence over time of the one or more content pieces; and associating the selected document classification with the document.

7. The computer readable medium of claim 6, wherein the document classification is one of news, a blog or an advertisement.

8. The computer readable medium of claim 6, wherein the operations further comprise associating an author classification with the document's author based at least partly on the rate of occurrence over time of the one or more content pieces in the second corpus of documents.

9. The computer readable medium of claim 8, wherein the author classification is one of reporter, blogger or advertiser.

10. A system comprising:

one or more processors; and a computer readable medium coupled to the one or more processors, having instructions stored thereon which, when executed by the one or more processors, cause the one or more processors to perform operations comprising:

fragmenting a document into a plurality of content pieces, each of the content pieces representing a number of consecutive words in the document, the document having a date of creation and an author;

comparing the document's content pieces to a repository of stored content pieces that occur in a first corpus of documents, each document of the first corpus having a date that is earlier than the date of the document and an author that is not the same as the author of the document;

determining that one or more of the document's content pieces does not match at least one of the stored content pieces;

in response to determining that one or more of the document's content pieces does not match at least one of the stored content pieces, determining that the one or more content pieces are original content pieces, wherein an original content piece is a content piece that has not occurred in the first corpus of documents;

determining a rate of occurrence over time of the one or more content pieces in a second corpus of documents, wherein determining the rate of occurrence comprises determining the rate of occurrence over time of the one or more content pieces for each of a plurality of time intervals, the rate of occurrence over time of the one or more content pieces in an interval based on a count of a number of the other documents that both contain the first content piece and are associated with a time within the interval, each document of the second corpus having a date that is later than the date of the document and an author that is not the same as the author of the document;

comparing the rate of occurrence over time of the one or more content pieces to predefined copying patterns that are each associated with a different document classification;

selecting a document classification that is associated with a predefined copying pattern that is most consistent with the rate of occurrence over time of the one or more content pieces; and associating the selected document classification with the document.

11. The system of claim 10, wherein the document classification is one of news, a blog or an advertisement.

12. The system of claim 10, wherein the operations further comprise: associating an author classification with the document's author based at least partly on the rate of occurrence over time of the one or more content pieces in the second corpus of documents.

13. The system of claim 12, wherein the author classification is one of reporter, blogger or advertiser.

* * * * *

UNITED STATES PATENT AND TRADEMARK OFFICE
CERTIFICATE OF CORRECTION

| | | |
|---|---|---|
| PATENT NO. | : 8,577,866 B1 | Page 1 of 1 |
| APPLICATION NO. | : 11/608207 | |
| DATED | : November 5, 2013 | |
| INVENTOR(S) | : Douwe Osinga and Stefan Christoph | |

It is certified that error appears in the above-identified patent and that said Letters Patent is hereby corrected as shown below:

Title page, item (73), delete "Googe Inc." and insert therefor -- Google Inc. --

Signed and Sealed this
Twenty-fifth Day of February, 2014

Michelle K. Lee
*Deputy Director of the United States Patent and Trademark Office*